US012639676B2

(12) United States Patent
Yoon et al.

(10) Patent No.: US 12,639,676 B2
(45) Date of Patent: May 26, 2026

(54) COMMUNITY MANAGEMENT APPARATUS AND COMMUNITY MANAGEMENT METHOD THEREBY

(71) Applicant: NAVER CORPORATION, Gyeonggi-do (KR)

(72) Inventors: Sa Ra Yoon, Seongnam-si (KR); Seok Woo Lee, Seongnam-si (KR); Jane Choi, Seongnam-si (KR); Hyun Min Lee, Seongnam-si (KR); Si Hyeon Park, Seongnam-si (KR); Dae Hyun Park, Seongnam-si (KR); Jung Hun Bae, Seongnam-si (KR); Young Bae Hyun, Seongnam-si (KR); Sun Mee Kim, Seongnam-si (KR); Kyung Man Kwak, Seongnam-si (KR); Young Sun Min, Seongnam-si (KR); Yong Kyu Lee, Seongnam-si (KR); Man Joon Kim, Seongnam-si (KR); Ji Hoon Ko, Seongnam-si (KR); O Shik Kwon, Seongnam-si (KR); Hyo Jong Kim, Seongnam-si (KR); Ye Seul Kim, Seongnam-si (KR); Ji Hyun Kim, Seongnam-si (KR); Jung Min Lee, Seongnam-si (KR)

(73) Assignee: NAVER Corporation, Gyeonggi-do (KR)

( * ) Notice: Subject to any disclaimer, the term of this patent is extended or adjusted under 35 U.S.C. 154(b) by 864 days.

(21) Appl. No.: 17/370,319

(22) Filed: Jul. 8, 2021

(65) Prior Publication Data

US 2022/0012819 A1     Jan. 13, 2022

(30) Foreign Application Priority Data

Jul. 8, 2020     (KR) ........................ 10-2020-0084346

(51) Int. Cl.
*G06Q 10/40* (2026.01)
*G06F 3/0482* (2013.01)
*H04L 51/216* (2022.01)

(52) U.S. Cl.
CPC ........... *G06Q 10/40* (2026.01); *H04L 51/216* (2022.05); *G06F 3/0482* (2013.01); *G06Q 2230/00* (2013.01)

(58) Field of Classification Search
CPC .................... G06Q 50/00–60; G06Q 2230/00
See application file for complete search history.

(56) References Cited

U.S. PATENT DOCUMENTS

| 7,702,545 B1 * | 4/2010 | Compton ............... | G06Q 30/08 705/26.9 |
| 11,064,315 B2 | 7/2021 | Jung et al. | |

(Continued)

FOREIGN PATENT DOCUMENTS

| KR | 2000-0050117 A | 8/2000 |
| KR | 2001-0066831 A | 7/2001 |

(Continued)

OTHER PUBLICATIONS

Office Action for Korean Application No. 10-2020-0084346 dated Jul. 5, 2022.

(Continued)

*Primary Examiner* — Mohammad A. Nilforoush
(74) *Attorney, Agent, or Firm* — Harness, Dickey & Pierce, P.L.C.

(57) ABSTRACT

Provided is a community management method including: receiving, from a first terminal, a generation request for a standby community; generating the standby community including a user of the first terminal as a participant, according to the generation request for the standby community; and generating a regular community including partici- (Continued)

pants of the standby community as members in response to a number of the participants of the standby community reaching a target number of the standby community, wherein a writing function is restricted in the standby community and allowed in the regular community.

15 Claims, 12 Drawing Sheets

(56)                    References Cited

U.S. PATENT DOCUMENTS

| | | | | |
|---|---|---|---|---|
| 2007/0288602 A1* | 12/2007 | Sundaresan | ............ | G06Q 30/06 |
| | | | | 709/219 |
| 2010/0180232 A1* | 7/2010 | Honan | ................... | G06Q 30/02 |
| | | | | 715/811 |
| 2011/0149809 A1* | 6/2011 | Narayanaswamy | ..... | H04N 7/15 |
| | | | | 379/202.01 |
| 2014/0067972 A1* | 3/2014 | Kageyama | .............. | H04L 51/52 |
| | | | | 709/206 |
| 2015/0281384 A1* | 10/2015 | Gunnarsson | ........... | G06Q 10/10 |
| | | | | 709/204 |
| 2017/0024832 A1* | 1/2017 | Dareshani | ............ | G06Q 20/065 |
| 2017/0295183 A1* | 10/2017 | Movsisyan | ........... | H04L 63/105 |

FOREIGN PATENT DOCUMENTS

| | | | |
|---|---|---|---|
| KR | 2004-0082023 A | 9/2004 |
| KR | 10-2006-0127677 A | 12/2006 |
| KR | 10-2014-0146724 A | 12/2014 |
| KR | 2016-0037362 A | 4/2016 |

OTHER PUBLICATIONS

Office Action dated Jan. 3, 2022 issued in corresponding Korean patent application No. 10-2020-0084346.

* cited by examiner

FIG. 8

COMMUNITY MANAGEMENT APPARATUS AND COMMUNITY MANAGEMENT METHOD THEREBY

CROSS-REFERENCE TO RELATED APPLICATION

This application is based on and claims priority under 35 U.S.C. § 119 to Korean Patent Application No. 10-2020-0084346, filed on Jul. 8, 2020, in the Korean Intellectual Property Office, the disclosure of which is incorporated by reference herein in its entirety.

BACKGROUND

1. Field

The present disclosure relates to the fields of online community. More particularly, the present disclosure relates to a community management apparatus and method of managing, such as generating or deleting, a community online.

2. Description of Related Art

This section provides background information related to the present disclosure which is not necessarily prior art.

Many users use communities online to socialize, strengthen personal connections, exchange information, and the like. Users may express their intent by uploading postings, photographs, or moving images on the communities.

Popular communities are actively operated with hundreds of thousands of members. However, unpopular communities have a smaller number of members, and thus, the willingness of the members to be active may decrease.

In particular, a community that has not been created for a long time is highly likely to have a low number of members, and thus, the operation of the community may be interrupted even before full-scale activities are performed.

SUMMARY

This section provides a general summary of the inventive concepts, and is not a comprehensive disclosure of its full scope or all features of the inventive concepts.

Provided are a community management apparatus and a community management method thereby, which enable invigoration of a regular community by supporting a standby community aiming at recruitment of members.

Also, provided are a community management apparatus and a community management method thereby, which enable a switch between a regular community and a standby community such that pieces of information in the regular community being operated may be continuously used.

Additional aspects will be set forth in part in the description which follows and, in part, will be apparent from the description, or may be learned by practice of the presented example embodiments.

According to an example embodiment of the present disclosure, a community management method includes: receiving, from a first terminal, a generation request for a standby community; generating the standby community including a user of the first terminal as a participant, according to the generation request for the standby community; and generating a regular community including participants of the standby community as members in response to a number of the participants of the standby community reaching a target number of the standby community, wherein a writing function is restricted in the standby community and allowed in the regular community.

According to another example embodiment of the present disclosure, a community management apparatus includes: a memory storing at least one instruction; and processing circuitry configured to execute the at least one instruction to: receive, from a first terminal, a generation request for a standby community; generate the standby community including a user of the first terminal as a participant, according to the generation request for the standby community; and generate a regular community including participants of the standby community as members in response to a number of participants of the standby community reaching a target number of the standby community, wherein a writing function is restricted in the standby community and allowed in the regular community.

According to another example embodiment of the present disclosure, a community generation method includes: transmitting a generation request for a standby community to a community management apparatus; receiving an interface screen of the standby community from the community management apparatus; and receiving, from the community management apparatus, an interface screen of a regular community including participants of the standby community as members of the regular community in response to a number of the participants of the standby community reaching a target number of the standby community, wherein a writing function is restricted in the standby community and allowed in the regular community.

BRIEF DESCRIPTION OF THE DRAWINGS

Example embodiments will be described in more detail with regard to the figures, wherein like reference numerals refer to like parts throughout the various figures unless otherwise specified, and wherein:

A brief description of each drawing is provided to better understand the drawings cited herein.

FIG. 8 illustrates a chatting interface screen in a standby community and a chatting interface screen in a regular community;

Figure 1:
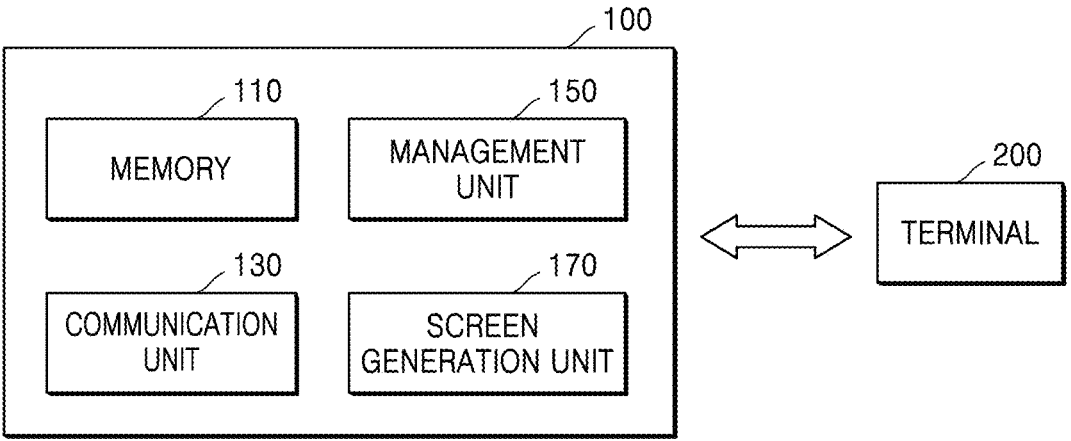
FIG. 1 is a block diagram of a configuration of a community management apparatus, according to an example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may include or be implemented in or more processing circuitries such as hardware including logic circuits; a hardware/software combination such as a processor executing software, and/or a combination thereof. For example, the processing circuitries more specifically may include, but is not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, an application specific integrated circuit, (ASIC) or any other device capable of responding to and executing instructions in a defined manner.

Software may include a computer program, program code, instructions, or some combination thereof, for independently or collectively instructing or configuring a hardware device to operate as desired. The computer program and/or program code may include a program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random-access memory (RAM), read only memory (ROM), a permanent mass storage device (such as a disk drive), a solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer-readable storage medium into the one or more storage devices and/or one or more computer processing devices using a drive mechanism. Such a separate computer-readable storage medium may include a universal serial bus (USB) flash drive, a memory stick, a Blu-ray/DVD/CD-ROM drive, a memory card, and/or other similar computer-readable storage media. The computer programs, program code, instructions, or some combination thereof, may be loaded into the one or more storage devices and/or the one or more computer processing devices from a remote data storage device via a network interface, rather than via a local computer-readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and/or one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

As the present disclosure allows for various changes and numerous examples, particular example embodiments will be illustrated in the drawings and described in detail in the written description. However, this is not intended to limit the present disclosure to particular modes of practice, and it will be understood that all changes, equivalents, and substitutes that do not depart from the spirit and technical scope of the present disclosure are encompassed in the present disclosure.

In the description of example embodiments, certain detailed explanations of related art are omitted when it is deemed that they may unnecessarily obscure the essence of the present disclosure. Also, numbers (for example, a first, a second, and the like) used in the description of example embodiments are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

In the present specification, a "community" denotes a virtual gathering in which users share information or interact with each other via a network, such as the Internet. The users may interact with other uses by uploading text, a moving image, or an image on an Internet space corresponding to the community.

Hereinafter, example embodiments of the present disclosure will be described in detail.

FIG. 1 is a block diagram of a configuration of a community management apparatus 100, according to an example embodiment.

Referring to FIG. 1, the community management apparatus 100 may include a memory 110, a communication unit 130, a management unit 150, and a screen generation unit 170.

The memory 110 stores at least one instruction for managing a community described below. The memory 110 may store information about pre-generated communities, information about users who joined the community management apparatus 100 as members (for example, identification information of the users and information about a community joined by each or one or more user), and the like.

The memory 110 may include at least one of a hard disk drive (HDD), a solid-state drive (SSD), a universal serial bus (USB) device, a floppy disk, magnetic tape, an optical disk (a CD, a DVD, or a Blue-ray disk), read-only memory (ROM), programmable ROM (PROM), erasable programmable ROM (EPROM), random-access memory (RAM), dynamic RAM (DRAM), and/or static RAM (SRAM).

The communication unit 130, the management unit 150, and/or the screen generation unit 170 may be implemented with at least one processor. The communication unit 130, the management unit 150, and/or the screen generation unit 170 may perform operations of managing the community described below, as the instructions stored in the memory 110 are executed.

The communication unit 130 may transmit/receive data to/from a terminal 200 via the network. The communication unit 130 may receive a community-related request from the terminal 200 and/or transmit an interface screen generated by the screen generation unit 170 to the terminal 200. The community-related request of the terminal 200 may include a generation request, a deletion request, a search request, and/or a setting change request for a community.

The terminal 200 may include any one of various types of devices, such as a smartphone, a tablet personal computer (PC), a desktop PC, a laptop computer, a wearable device, etc., which are capable of transmitting/receiving data to/from the community management apparatus 100 via the network, and display the interface screen received from the community management apparatus 100.

The management unit 150 manages communities according to a request of the terminal 200. In detail, the management unit 150 may generate a community according to the generation request and/or delete a pre-generated community according to the deletion request. Also, the management unit 150 may change various settings of a community according to a request of the terminal 200. The management unit 150 may add a user of the terminal 200 as a member of a community, according to a joining request of the terminal 200 regarding the community.

The screen generation unit 170 generates various types of interface screens displayed on the terminal 200. The interface screen transmitted to the terminal 200 may be displayed on a display of the terminal 200. Various interface screens displayed on the display of the terminal 200 are described below with reference to FIGS. 3 through 11.

Figure 2:
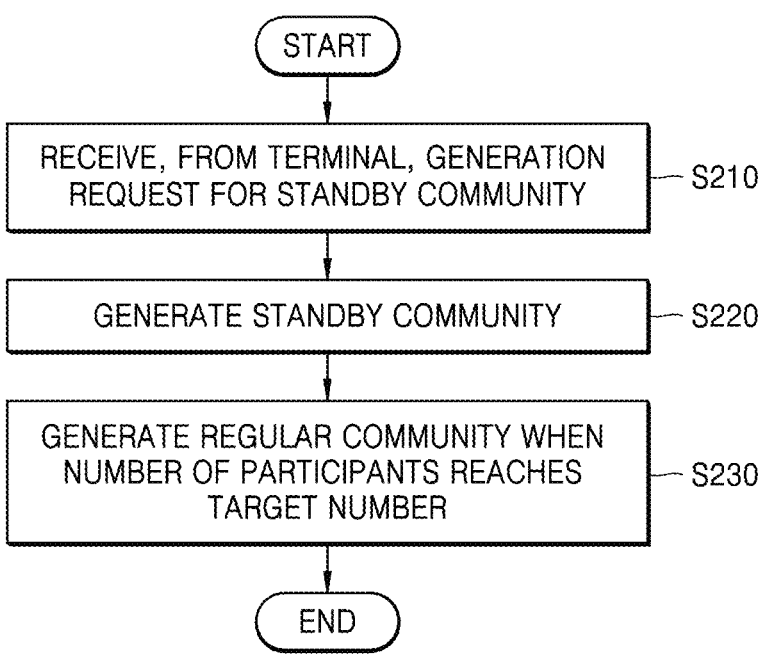
FIG. 2 is a flowchart of a community management method performed by a community management apparatus, according to an example embodiment.

FIG. 2 is a flowchart of a community management method performed by the community management apparatus 100, according to an example embodiment.

In operation S210, the community management apparatus 100 receives, from the terminal 200, a generation request for a standby community.

The standby community is a community generated to recruit members before generating a regular community. The standby community is distinguished from the regular community in that a writing function is restricted in the standby community, whereas the writing function is allowed in the regular community. According to an example embodiment, a function, for example, a member invitation function, a member authority setting function, a member joining requirement setting function, or the like, which is allowed in the regular community, may not be allowed in the standby community.

The community management apparatus 100 may further receive, from the terminal 200, a target number of the standby community. When the target number is not received from the terminal 200, the community management apparatus 100 may determine the target number of participants of the standby community to a pre-set (or alternately given) number.

In operation S220, the community management apparatus 100 generates the standby community including a user of the terminal 200 as a participant. According to generation of the standby community, the community management apparatus 100 may transmit, to the terminal 200, a main interface screen of the standby community. Here, transmitting of the interface screen to the terminal 200 not only indicates that the interface screen itself is transmitted to the terminal 200, but also indicates that data (for example, program code) enabling the terminal 200 to configure and display the interface screen is transmitted.

In operation S230, when the number of participants of the standby community reaches the target number, the community management apparatus 100 generates a regular community including the participants of the standby community as members.

The standby community may be deleted when the regular community is generated. When the number of participants of the standby community does not reach the target number within a certain period, the community management apparatus 100 may delete the standby community.

According to an example embodiment of the present disclosure, because the standby community is generated first and the regular community is generated when the number of participants reaches the target number, the number of members of the regular community may be guaranteed and a decrease in the willingness to be active in the regular community including the low number of members may be reduced or prevented.

The community management apparatus 100 may set a founder of the standby community as an administrator of the regular community when generating the regular community. According to an example embodiment, the community management apparatus 100 may set, as the administrator of the regular community, a participant assigned by the founder of the standby community or a participant selected as a result of a vote of between the participants of the standby community.

The community management apparatus 100 may set all of the participants of the standby community as members of the regular community, or, according to an example embodiment, may set only a participant who satisfies a member joining requirement from among the participants of the standby community, as the member of the regular community. A participation standard of the standby community aiming at member recruitment may be lower than that of the regular community, and thus, only a participant who satisfies the member joining requirement (for example, an age, a gender, a job, an academic background, a dwelling area, etc.) set by the founder of the standby community and/or the administrator of the regular community, may be set as the member of the regular community, when the regular community is generated.

According to an example embodiment, the community management apparatus 100 may generate the regular community including the participants of the standby community as members, upon a request of the terminal 200, even when the number of participants of the standby community did not reach the target number. In other words, when there is a request of a user who established the standby community, the standby community may be switched to the regular community even when the participants are not recruited up to a satisfied number.

According to an example embodiment, the community management apparatus 100 may switch the regular community to the standby community when there is a request of the administrator of the regular community after the regular community is generated. When the number of participants of the standby community reaches the target number after the regular community is switched to the standby community, the standby community may be switched back to the regular community.

According to the present disclosure, a switch between the regular community and the standby community is enabled such that it is possible to concentrate on member recruitment via the standby community when the number of members of the regular community that is already operating is reduced. When the number of members of the regular community that is being actively operated is reduced, the willingness of the members to be active may decrease, and thus, the operation of the regular community may be interrupted. There may be many pieces of available content when the regular community has been actively operated, but when the operation of the regular community is interrupted due to the reduced number of members, such useful content may be unable to be used. Accordingly, in the present disclosure, the switch between the regular community and the standby community is allowed such that a possibility of continuously using the useful content stored in the regular community is increased.

Hereinafter, operations of the terminal 200 and the community management apparatus 100 will be described based on the interface screen displayed on the terminal 200.

Figure 3:
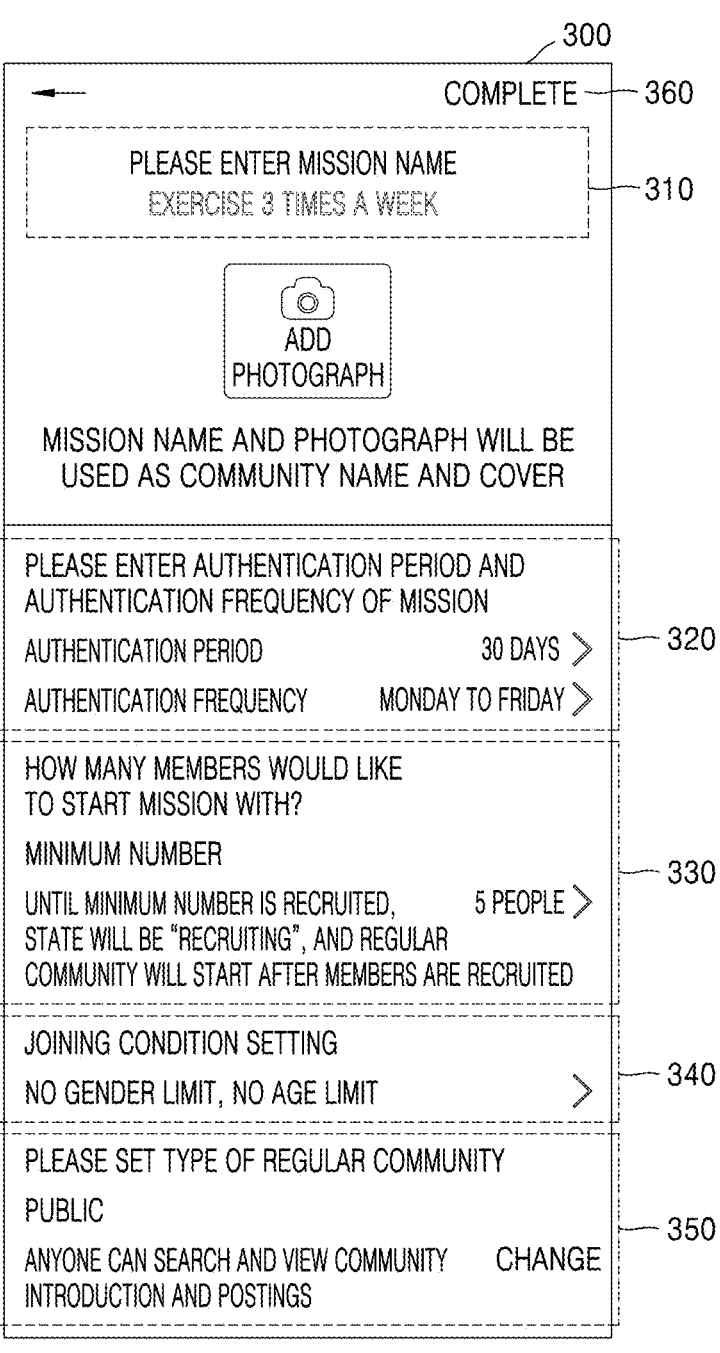
FIG. 3 illustrates an interface screen for generating a standby community.

FIG. 3 illustrates an interface screen 300 for generating a standby community.

Referring to FIG. 3, a menu for setting a name of a standby community may be included in a first region 310 of the interface screen 300. A user may set the name of the standby community by selecting the first region 310. The name of the standby community may be a search standard of communities. The name of the standby community may be maintained even in a regular community.

A menu for setting a mission authentication period and a mission authentication frequency may be included in a second region 320 of the interface screen 300. The mission authentication period and the mission authentication frequency may be set when a goal of the standby community is mission achievement. Accordingly, when the goal of the standby community is not mission achievement, the menu for setting the mission authentication period and the mission authentication frequency may not be included in the interface screen 300.

A menu for setting a target number of the standby community may be included in a third region 330 of the interface screen 300. The user may set the target number of the standby community by selecting the third region 330. When the user does not input the target number, a pre-set (or alternately given) value may be set as the target number.

A menu for setting a joining condition of the standby community may be included in a fourth region 340 of the interface screen 300. The user may set a gender, an age, and/or the like of a participant capable of joining the standby community by selecting the fourth region 340. The gender and the age are only examples, and various standards may be set as the joining condition.

A menu for setting a type of a regular community to be generated later may be included in a fifth region 350 of the interface screen 300. The type of the regular community may include a private type, a public type, and/or the like. In the public type, anyone is allowed to search the regular community, view postings, and/or the like, and in the private type, searching of the regular community and/or viewing of the postings may be restricted.

After setting the standby community, the user may select a complete menu 360 such that a generation request for the standby community is transmitted from the terminal 200 to the community management apparatus 100. In response to the generation request, the community management apparatus 100 may generate the standby community including the user who transmitted the generation request as a participant. The user who transmitted the generation request is a founder of the standby community and may change settings of the standby community, and/or the like.

The menus shown in FIG. 3 are only examples and at least some of the menus may not be present on the interface screen 300, and/or a new menu may be added to the interface screen 300.

Figure 4:
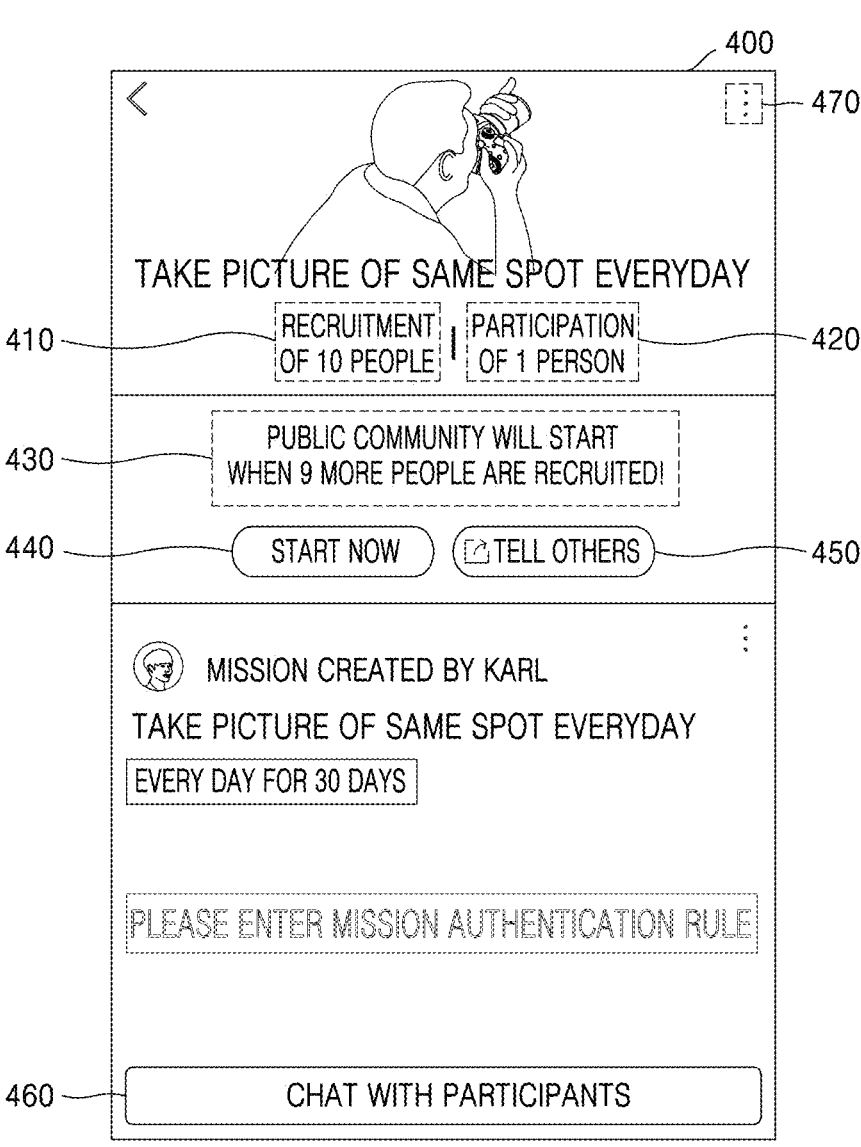
FIG. 4 illustrates a main interface screen of a standby community.

FIG. 4 illustrates a main interface screen 400 of a standby community.

When the standby community is generated, the community management apparatus 100 may transmit the main interface screen 400 of the standby community to the terminal 200.

As shown in FIG. 4, the main interface screen 400 may display a target number 410 and a current number 420 of participants. When the current number 420 of participants reaches the target number 410, the community management apparatus 100 may switch the standby community to a regular community.

The main interface screen 400 may display, as indicated by a reference numeral 430, a number for reaching the target number 410 and a type of the regular community to be generated later. According to an example embodiment, the target number and/or the type of regular community may not be displayed on the main interface screen 400, or only one of the target number and/or the type of regular community may be displayed on the main interface screen 400.

As described above, even when the number of participants of the standby community did not reach the target number, the community management apparatus 100 may switch the standby community to the regular community according to a request of a user of the terminal 200. In this regard, a menu 440 for a switch request to the regular community may be included in the main interface screen 400. The user may select the menu 440 to switch the standby community to the regular community.

A "Tell Others" menu 450 displayed on the main interface screen 400 is a menu for uploading information about the standby community on another community or another social networking service (SNS) program. Participants of the standby community may promote the standby community via the "Tell Others" menu 450 to recruit a new participant.

According to an example embodiment, the participants of the standby community may chat with other participants via a participant chatting menu 460. The participants may share information, discuss a member recruitment method, and/or the like, via a chatting function. Although not shown in FIG. 4, when a new message that is not read is present on a chatting interface screen, the number of unread messages may be displayed on the participant chatting menu 460.

A setting menu 470 is a menu for changing settings of the standby community. A founder of the standby community may select the setting menu 470 to change the target number and/or the like, and a setting interface screen is described below with reference to FIG. 7.

Figure 5:
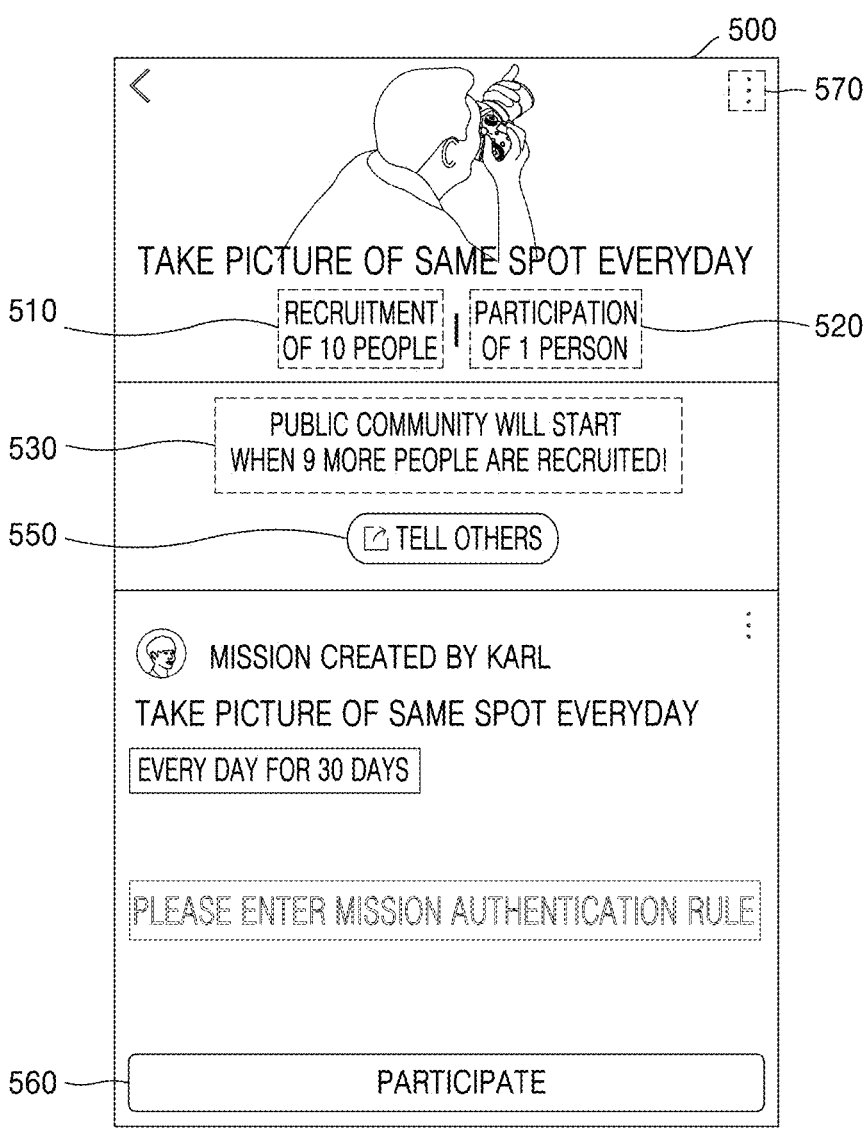
FIG. 5 illustrates a main user interface when a nonparticipant accesses a standby community.

FIG. 5 illustrates a main user interface 500 when a nonparticipant accesses a standby community.

When a user who did not participate in the standby community accesses the standby community, the community management apparatus 100 may transmit the main user interface 500 of FIG. 5 to the terminal 200 of the user.

Compared with the main interface screen 400 of FIG. 4, the main user interface 500 of FIG. 5 does not include the menu 440. This is because the user who did not participate in the standby community and/or a user who is not a founder of the standby community despite participation in the standby community is not allowed to switch the standby community to a regular community.

Referring to FIG. 5, the main user interface 500 includes a participation menu 560 and the user may join the standby community via the participation menu 560. When a new participant is added, a current number 520 of participants may be increased and/or a required (or target) number 530 may be decreased. In other words, when the user selects the participation menu 560 in FIG. 5, the current number 520 may be increased from 1 to 2, and/or the required (or target) number 530 may be decreased from 9 to 8. Also, when the user joins the standby community by selecting the participation menu 560, the participation menu 560 may be changed to a participant chatting menu.

The user may select a setting menu 570 to leave the standby community and/or report an inappropriate standby community. At least some of setting functions to be described with reference to FIG. 7 may be realized such as not to be used by a participant who is not the founder of the standby community.

Figure 6:
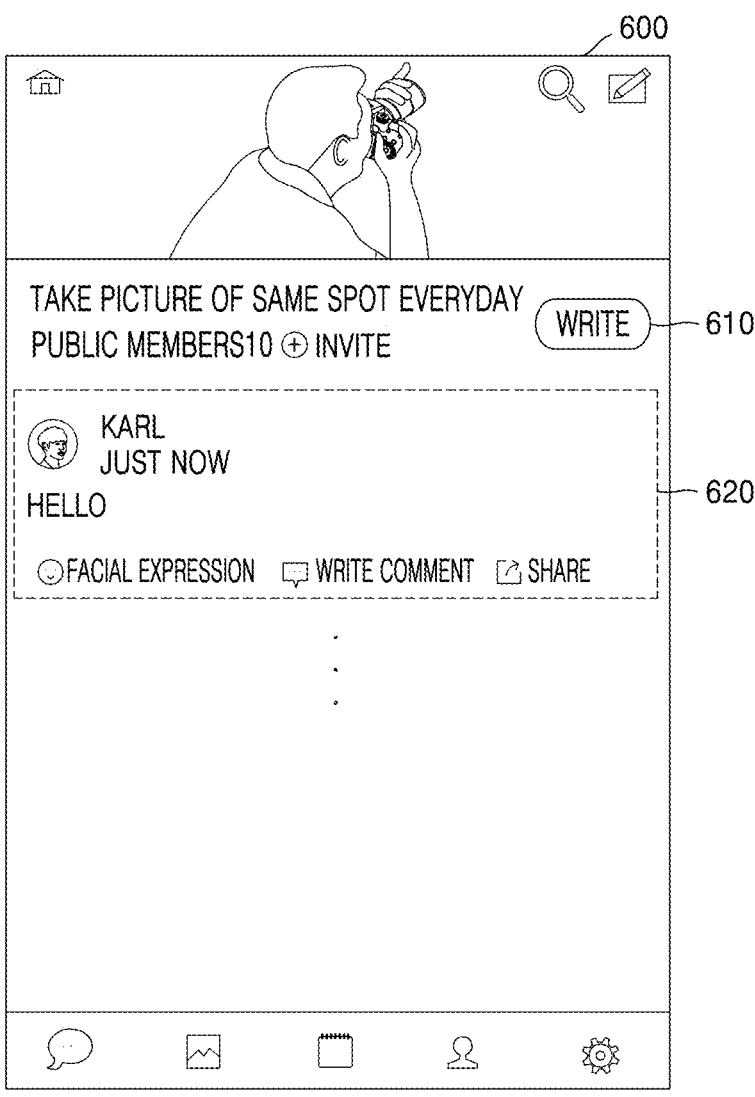
FIG. 6 illustrates a main interface screen of a regular community.

FIG. 6 illustrates a main interface screen 600 of a regular community.

When the number of participants of a standby community reaches a target number and/or a founder of the standby community requests a switch to the regular community, the community management apparatus 100 may generate the regular community. When the regular community is generated, the community management apparatus 100 may transmit the main interface screen 600 of the regular community to the terminal 200.

As shown in FIG. 6, the main interface screen 600 of the regular community may include a write menu 610 and/or content 620 generated via the write menu 610. In other words, because a writing function is restricted in the standby community, the main interface screens 400 and/or 500 of the standby community of FIGS. 4 and 5 do not include a write menu, but the main interface screen 600 of the regular community may include the write menu 610.

Figure 7:
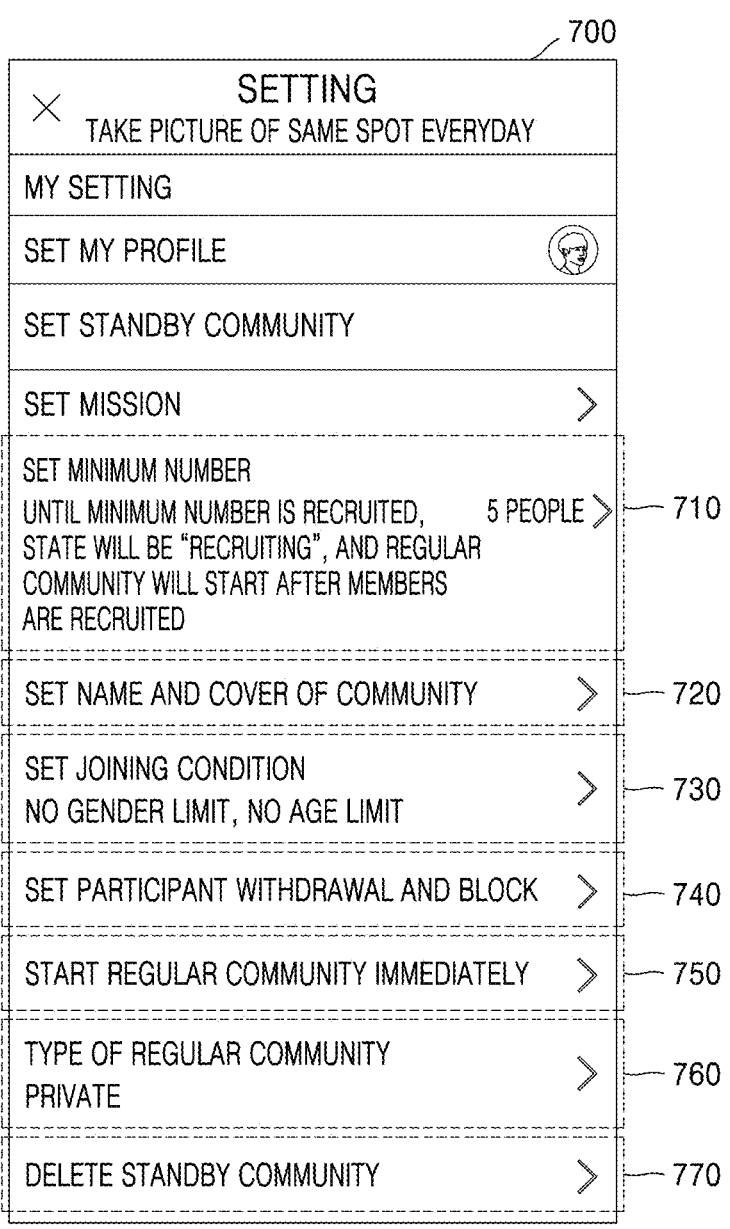
FIG. 7 illustrates a setting interface screen for setting a standby community.

FIG. 7 illustrates a setting interface screen 700 for setting a standby community.

A user may select the setting menu 470 of FIG. 4 to change, via the setting interface screen 700, items set via the interface screen 300 of FIG. 3.

As shown in FIG. 7, a first region 710 of the setting interface screen 700 may include a menu for selecting a target number of the standby community. The user may select a menu in the first region 710 to input a target number to be recruited via the standby community. When the user does not input the target number, a pre-set (or alternately given) value may be determined as the target number.

A menu for setting a name of the standby community may be included in a second region 720 of the setting interface screen 700. When the name of the standby community has been set via the interface screen 300 of FIG. 3, the user may change the name via the menu included in the second region 720.

A menu for setting a joining condition of the standby community may be included in a third region 730 of the setting interface screen 700. The user may set a gender, an age, and/or the like of a participant capable of joining the standby community by selecting the third region 730. The gender and the age are only examples, and various standards may be set as the joining condition.

A fourth region 740 of the setting interface screen 700 may include a menu for withdrawing a participant of the standby community from the standby community and/or preventing the participant from rejoining the standby community after withdrawal. The user may select a participant to be withdrawn from a participant list of the standby community and withdraw/block the participant.

A menu for switching to a regular community may be included in a fifth region 750 of the setting interface screen 700. The user may switch the standby community to the regular community by selecting the fifth region 750 even when a current number of participants did not reach the target number.

A menu for setting a type of the regular community to be generated later may be included in a sixth region 760 of the setting interface screen 700. The type of the regular community may include a private type, a public type, and/or the like.

A menu for deleting the standby community may be included in a seventh region 770 of the setting interface screen 700. When the user selects the menu for deleting the standby community, the community management apparatus 100 may delete the standby community. When there is a participant other than a founder of the standby community, the community management apparatus 100 may allow deletion of the standby community after the participant leaves the standby community.

The menus shown in FIG. 7 are only examples, and at least some of the menus may not be present on the setting interface screen 700, and/or a new menu may be added to the setting interface screen 700.

Figure 8:
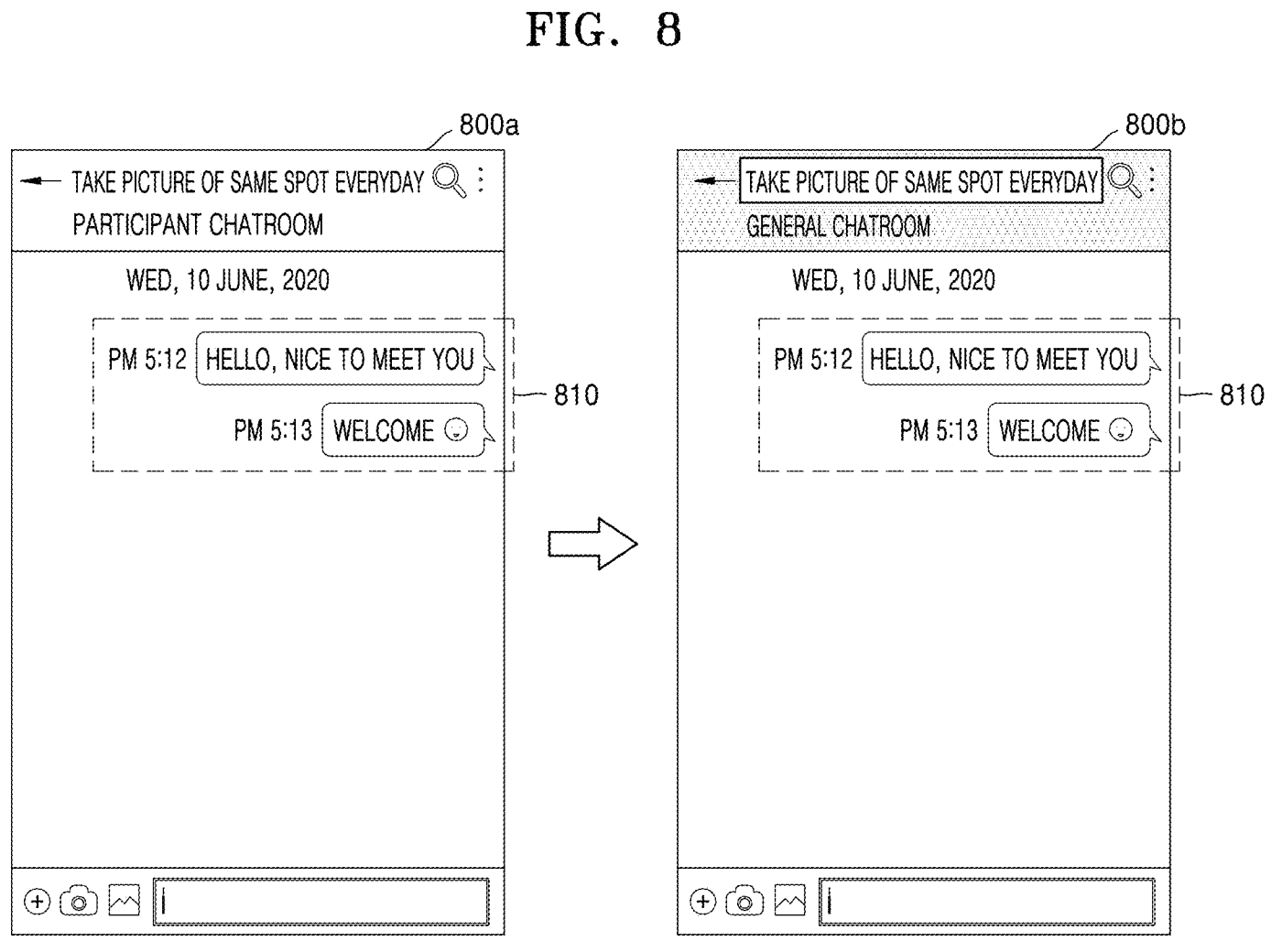

FIG. 8 illustrates a chatting interface screen 800*a* in a standby community and a chatting interface screen 800*b* in a regular community.

As described above, participants of the standby community may be allowed to chat with other participants. For example, the participant may enter a chatting space by selecting a chatting participation menu in an interface screen.

According to an example embodiment, to maintain continuity of the standby community and the regular community, a chatting history in the standby community may be maintained in the regular community.

As shown in FIG. 8, messages 810 displayed on the chatting interface screen 800a of the standby community may be displayed as they are on the chatting interface screen 800b of the regular community.

Figure 9:
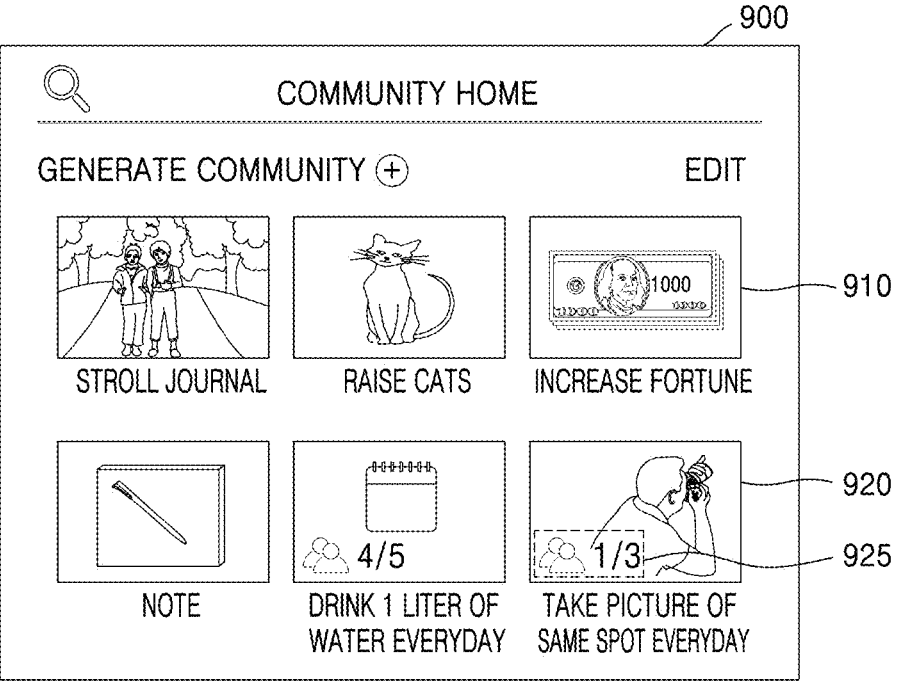
FIG. 9 illustrates a list of communities generated by a user.

FIG. 9 illustrates a list of communities generated by a user.

The user may identify, via the terminal 200, the list of communities established by him/herself. An interface screen 900 displays the communities established by the user. For example, thumbnails (or cover images) and names of the communities may be displayed on the interface screen 900.

When the user has generated a regular community 910 and a standby community 920, information about the regular community 910 and the standby community 920 may be displayed on the interface screen 900 together. The information about the regular community 910 and the standby community 920 may be displayed on the interface screen 900 differently. For example, as shown in FIG. 9, a target number and current number of participants may be displayed as indicated by a reference numeral 925, for the standby community 920. Accordingly, the user may identify which community is a regular community or a standby community, and identify the number of participants of the standby community.

According to an example embodiment, the regular community 910 and the standby community 920 may be distinguished from each other by displaying the information about the regular community 910 in a first color and the information about the standby community 920 in a second color different from the first color. Alternatively, an icon corresponding to a regular community may be displayed for the regular community 910 and/or an icon corresponding to a standby community may be displayed for the standby community 920.

Figure 10:
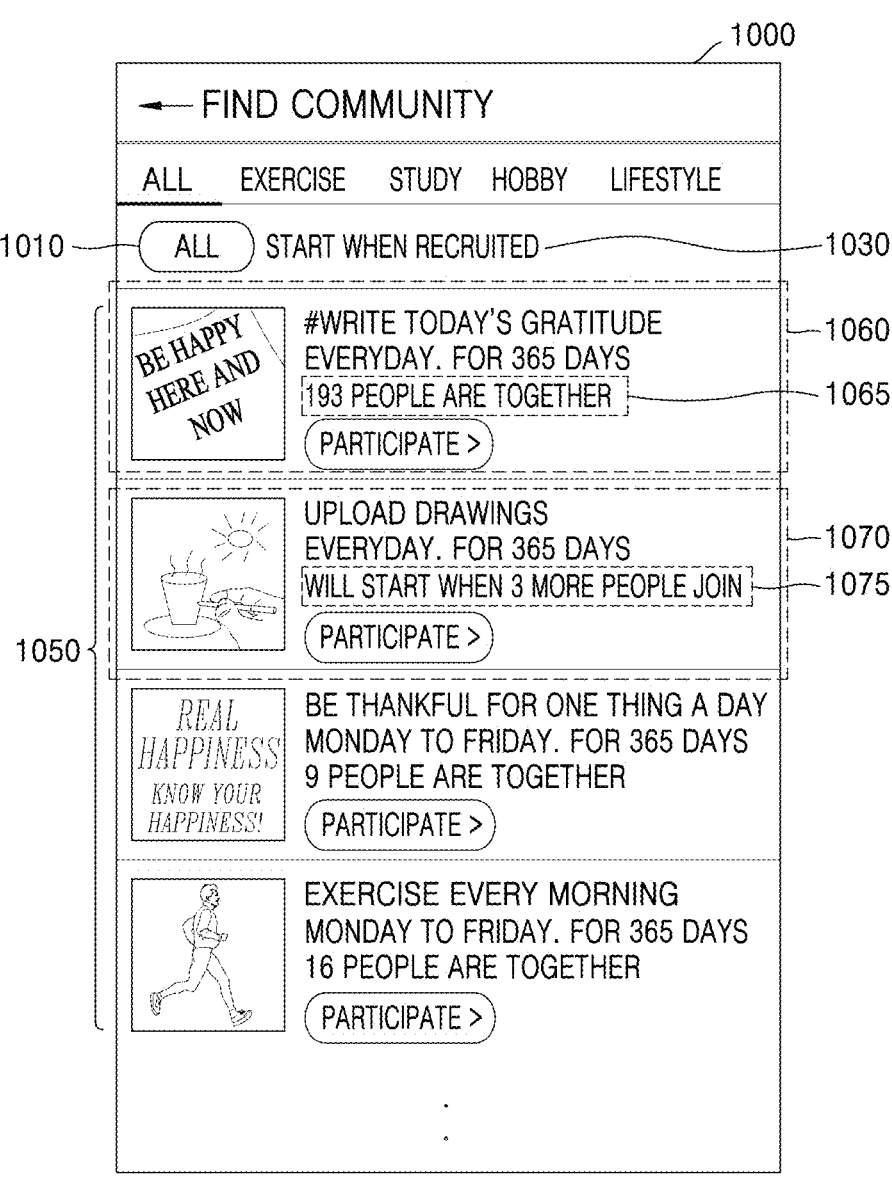
FIG. 10 illustrates a list of communities found according to a search request of a user.
Figure 11:
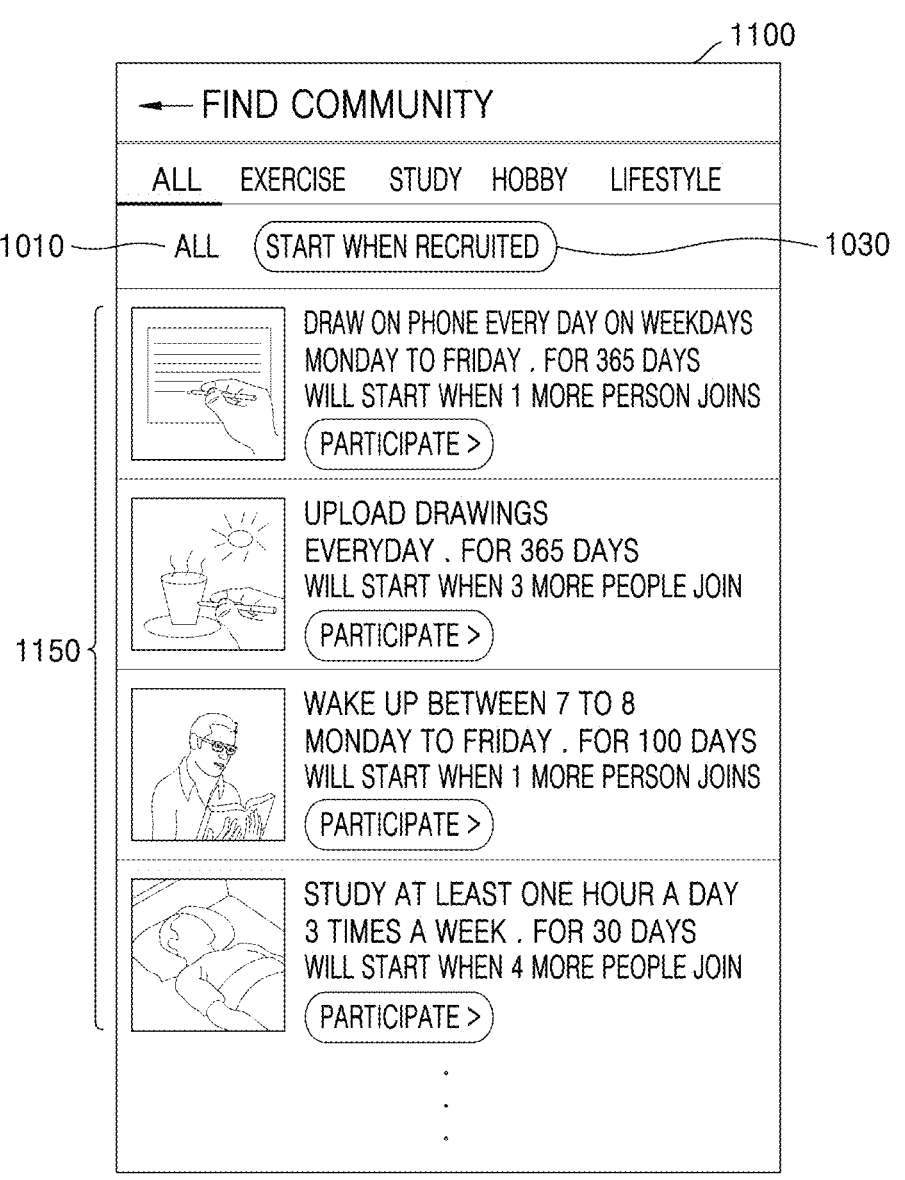
FIG. 11 illustrates a list of standby communities found according to a search request of a user.

FIGS. 10 and 11 illustrate a list of communities found according to a search request of a user.

The user may identify a list of communities generated by the community management apparatus 100, via a search request.

As shown in FIGS. 10 and 11, the community management apparatus 100 may transmit, to the terminal 200, interface screens 1000 and 1100 including the list of generated communities, according to the search request of the user.

A list 1050 in the interface screen 1000 of FIG. 10 may include a regular community 1060 and/or a standby community 1070, and a list 1150 of standby communities may be included in the interface screen 1100 as shown in FIG. 11, when the user selects a menu 1030. By selecting a menu 1010 or the menu 1030, the user may identify the list 1050 including regular communities and standby communities, or identify the list 1150 including only standby communities.

Referring to FIG. 10, a number 1065 of people currently acting as members may be displayed for the regular community 1060, and a required (or target) number 1075 of people may be displayed for the standby community 1070. Accordingly, the user may identify whether he/she is able to act as a member immediately after joining a community included in a list or is able to act as a member after additional participant recruitment. According to an example embodiment, information about the regular community 1060 may be displayed in a first color and information about the standby community 1070 may be displayed in a second color different from the first color. Alternatively, an icon corresponding to a regular community may be displayed for the regular community 1060 and an icon corresponding to a standby community may be displayed for the standby community 1070.

Figure 12:
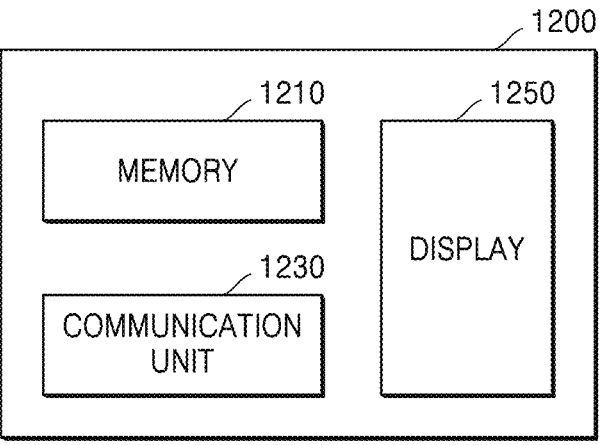
FIG. 12 is a block diagram of a configuration of a terminal, according to an example embodiment.

FIG. 12 is a block diagram of a configuration of a terminal 1200, according to an example embodiment.

Referring to FIG. 12, the terminal 1200 may include a memory 1210, a communication unit 1230, and a display 1250.

The memory 1210 may store instructions for a management request for a community. The management request for a community may include a generation request, a deletion request, a search request, and/or a setting change request for the community.

The communication unit 1230 transmits/receives data to/from the community management apparatus 100 via the network. The communication unit 1230 may transmit the management request to the community management apparatus 100 and receive an interface screen from the community management apparatus 100.

The display 1250 displays the interface screen received from the community management apparatus 100. When a user selects a menu included in the interface screen, the management request may be transmitted to the community management apparatus 100.

According to control of the user, the terminal 1200 may transmit, to the community management apparatus 100, a generation request and/or target number of a standby community. When generation of the standby community is completed, the terminal 1200 may receive a main interface screen of the standby community from the community management apparatus 100 and display the main interface screen.

As described above, when the number of participants of the standby community reaches the target number or the user requests a switch to a regular community, the terminal 1200 may receive an interface screen of the regular community from the community management apparatus 100.

Meanwhile, the example embodiments of the present disclosure described above may be written as computer-executable programs that may be stored in a medium.

The medium may continuously store the computer-executable programs, or temporarily store the computer-executable programs or instructions for execution and/or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as a CD-ROM and a DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A community management apparatus and a community management method thereby, according to an example embodiment, enable invigoration of a regular community by supporting a standby community aiming at recruitment of members.

Also, a community management apparatus and a community management method thereby, according to an example embodiment, enable a switch between a regular community and a standby community such that pieces of information in the regular community being operated may be continuously used by users.

However, effects achievable by the community management apparatus and community management method thereby are not limited to those mentioned above, and other effects not mentioned could be clearly understood by one of ordinary skill in the art from the foregoing description.

While one or more example embodiments of the present disclosure have been described with reference to the figures, it will be understood by those of ordinary skill in the art that various changes in form and details may be made therein without departing from the spirit and scope as defined by the following claims.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. The same may also be modified in various ways. Such modifications are not to be regarded as a departure from the disclosure, and all such modifications are intended to be included within the scope of the disclosure.

What is claimed is:

1. A community management method performed by a community management apparatus, the community management method comprising:

receiving, from a first terminal, a generation request of a standby community for mission achievement, and a target number;

generating the standby community including a user of the first terminal as a participant, according to the generation request of the standby community;

transmitting an interface screen of the standby community to the first terminal, the interface screen of the standby community not including a write function;

generating a regular community including participants of the standby community as members in response to a number of the participants of the standby community reaching the target number;

transmitting an interface screen of the regular community to the first terminal, the interface screen of the regular community including a write button for performing the write function; and providing, in response to a search request of a second terminal, a first list of standby communities to the second terminal, and wherein, in the first list, a number of participants required to be changed to a regular community is displayed for each standby community.

2. The community management method of claim 1, wherein the generating of the regular community comprises generating the regular community including the participants in response to a generation request for the regular community being received from the first terminal while the number of the participants is less than the target number.

3. The community management method of claim 1, further comprising, after the regular community is generated, switching the regular community to the standby community according to a request of an administrator of the regular community.

4. The community management method of claim 1, further comprising, deleting the standby community in response to the number of the participants not reaching the target number.

5. The community management method of claim 1, further comprising allowing a chatting function between the participants in the standby community, and maintaining a chatting history from the standby community in the regular community.

6. The community management method of claim 1, wherein the generating of the regular community comprises setting a participant other than the user of the first terminal as an administrator of the regular community, according to a request of the user of the first terminal or according to a result of a vote of the participants.

7. The community management method of claim 1, wherein the generating of the regular community comprises:

selecting a participant who satisfies a member joining requirement, from among the participants of the standby community; and generating the regular community including the selected participant as a member.

8. The community management method of claim 1, further comprising:

transmitting an interface screen of the standby community to the first terminal, the interface screen comprising a current number of participants, and increasing the current number of participants in the interface screen in response to a new participant being added to the standby community.

9. The community management method of claim 1, further comprising transmitting, to the first terminal, a second list of standby communities and regular communities generated by the user of the first terminal, wherein, in the second list, a target number and a current number of participants are displayed for each standby community.

10. The community management method of claim 1, wherein the first list includes regular communities and standby communities or includes only standby communities, according to a selection of the second terminal.

11. A non-transitory computer-readable recording medium configured to, in combination with hardware, execute the community management method of claim 1.

12. A community management apparatus comprising:

a memory storing at least one instruction; and processing circuitry configured to execute the at least one instruction to:

receive, from a first terminal, a generation request of a standby community for mission achievement, and a target number;

generate the standby community including a user of the first terminal as a participant, according to the generation request of the standby community;

transmit an interface screen of the standby community to the first terminal, the interface screen of the standby community not including a write function;

generate a regular community including participants of the standby community as members in response to a number of participants of the standby community reaching the target number;

transmit an interface screen of the regular community to the first terminal, the interface screen of the regular community including a write button for performing the write function; and

provide, in response to a search request of a second
  terminal, a first list of standby communities to the
  second terminal, and
wherein, in the first list, a number of participants required
  to be changed to a regular community is displayed for
each standby community.

13. The community management method of claim 1,
wherein the generating the regular community includes
including all participants of the standby community as
members of the regular community.

14. The community management method of claim 1,
wherein the interface screen of the standby community
  includes a tell others button, and
the method further includes providing a menu for upload-
  ing information about the standby community on
another community or another social networking ser-
  vice (SNS) program in response to a user selecting the
  tell others button.

15. The method of claim 1, further comprising:
providing a menu for generating content to be posted to
the regular community in response to a user selecting
  the write button.

\* \* \* \* \*